(12) United States Patent
Bauknecht et al.

(10) Patent No.: US 6,773,233 B2
(45) Date of Patent: Aug. 10, 2004

(54) FITTING OF BLADES IN HYDRODYNAMIC MACHINES

(75) Inventors: Gert Bauknecht, Immenstaad (DE); Walter Fritz, Immenstaad (DE); Alfred Skrabs, Sitterswald (DE); Reinhold Mayer, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/297,316

(22) PCT Filed: Jun. 8, 2001

(86) PCT No.: PCT/EP01/06532
§ 371 (c)(1),
(2), (4) Date: Dec. 4, 2002

(87) PCT Pub. No.: WO01/98021
PCT Pub. Date: Dec. 27, 2001

(65) Prior Publication Data
US 2003/0194317 A1 Oct. 16, 2003

(30) Foreign Application Priority Data
Jun. 17, 2000 (DE) ........................................ 100 30 0294

(51) Int. Cl.⁷ .............................................. F04D 29/38
(52) U.S. Cl. ................... 416/180; 416/185; 416/197 C; 416/220 A; 29/889.5; 29/509
(58) Field of Search ............................... 416/180, 185, 416/186 R, 187, 188, 197 C, 220 A, 221; 29/889.5, 889.2, 428, 525, 509

(56) References Cited

U.S. PATENT DOCUMENTS

| | | | |
|---|---|---|---|
| 2,478,306 A | 8/1949 | Orr | 103/115 |
| 4,133,091 A | 1/1979 | Ito | 29/33 K |
| 5,109,604 A | 5/1992 | Koebele | 29/889.5 |
| 6,416,285 B1 | 7/2002 | Fichter | 416/178 |

FOREIGN PATENT DOCUMENTS

| | | | |
|---|---|---|---|
| DE | 25 37 834 | 11/1979 | F04D/29/28 |
| DE | 197 07 557 A1 | 8/1998 | F01D/5/14 |
| DE | 197 07 558 A1 | 8/1998 | F01D/5/14 |
| DE | 199 13 259 C1 | 5/2000 | B23P/13/00 |
| EP | 0 732 519 A1 | 9/1996 | F16D/57/04 |
| GB | 1 522 032 | 8/1978 | F04D/17/04 |
| JP | 61115631 | 6/1986 | B21D/39/03 |
| JP | 03177651 | 8/1991 | F16H/41/28 |
| WO | 98/06958 | 2/1998 | F16D/33/00 |

Primary Examiner—Edward K. Look
Assistant Examiner—Dwayne J. White
(74) Attorney, Agent, or Firm—Davis & Bujold, PLLC

(57) ABSTRACT

A process of manufacturing a component for a hydrodynamic machine in which the component comprises a base body (16) and a plurality of blades (8) which are to be installed on the base body (16). The process comprises the steps of installing the plurality of blades (8) on the base body (16) by a shaped fitted connection with the base body (16) by applying continuous pressure against the base body (16) and using a prefabricated torus as the base body (16). The prefabricated torus is pressed by a pressure roller (20) against the plurality of blades (8) while holding the plurality of blades (8) in a device (4) against the pressure of the pressure roller (20). A component for a hydrodynamic machine, comprising a base body (16) and a plurality blades (8) installed by the inventive process, is also disclosed.

12 Claims, 1 Drawing Sheet

FITTING OF BLADES IN HYDRODYNAMIC MACHINES

FIELD OF THE INVENTION

The invention concerns a process for the production of components involved in the installation of blades in hydrodynamic machines and for components made by said process.

BACKGROUND OF THE INVENTION

Hydrodynamic systems encompass at least torque converters and abrasion free auxiliary brake apparatuses, the latter being also known as "retarders". These elements function in vehicle transmissions and vehicle drive trains. In said hydraulic systems, components are employed, which are equipped with a multiplicity of blades, in order to coact with the applied hydrodynamic fluids. The manufacture of these bladed components has been developed either on a basis of high functionality or on the basis of the greatest possible savings in cost.

Up to the present time, because of the lack of an optimized manufacturing technology, a conflict as to which goal is to be sought has arisen between the two named principles EP 07 32 519 A1, for instance, discloses a hydrodynamic retarder having a base body in which recesses have been machined for the positioning of the blades. The blades are to be inserted into the said recesses and subsequently affixed therein by welding or brazing, for example, and thus made integral with the said base body. A shape-fit connection for the transmission of the forces is carried out only under limited circumstances. Because of the high specific loadings, which can arise in retarder operation by cavitation, for example, this shape-fit method carries corresponding risks.

The invention has the purpose of disclosing a manufacturing process which is economic in nature and assures a reliable functionality of the components.

SUMMARY OF THE INVENTION

In accord with the invention, a process for the manufacture of components in hydrodynamic machines is proposed, wherein the hydrodynamic machines possess a blading which is constructed by blades which are to be bound to a base body. The blades are bound to the base body by shape-fitting, in a metal shaping process actuated by a continuously rotating pressure roller and a continuously applied pressure. In an advantageous embodiment of the invention, the base body, which is a prefabricated torus, is pressed by the pressure roller against the blades, while the blades are held against the pressure of the pressure roller by a holding apparatus. In one embodiment of the process, the pressure roller acts upon the base body on that side of the base body which is placed remote from the blades. In yet another embodiment, the pressure roller runs along the base body at right angles to the outer contour of a device in which the blades are held. Another embodiment shows, that the pressure roller is run counter to its direction of rotation along the base body, in order to press the material of the base body into the recesses between the blades for the formation of a shape-fit. In another advantageous embodiment, the blades held in a holding device are pressed against an outer contour, which corresponds to the contour of the blades, in order to maintain a constant shape of the blades when they are subjected to the pressure of the pressure roller. One embodiment exhibits a preshaped base body which, when subjected to the pressure of the pressure roller upon simultaneous creation of a shape-fit with the blades, obtains its final shape corresponding to the outer contour of the device.

In an advantageous embodiment example, there is a different wall thickness for the blades and/or the base body in their longitudinal length and/or in their width. By means of the application of a pressure roller, components can also be worked, which do not have a uniformly remaining wall thickness, so that the wall thickness can be set at a value for optimal functionality. The base body can be made of various construction materials.

One embodiment has a base body of a malleable aluminum alloy. Advantageously the hydrodynamic machine can be operated as a torque-converter for a vehicle transmission. It can also be operated as a hydrodynamic retarder, which latter supports the vehicle as an auxiliary to friction operated brakes during slowing of the vehicle, especially along long stretches of a downward grade.

BRIEF DESCRIPTION OF THE DRAWING

The invention will now be described, by way of the example, with reference to the accompanying drawings in which.

DETAILED DESCRIPTION OF THE INVENTION

Figure 1:
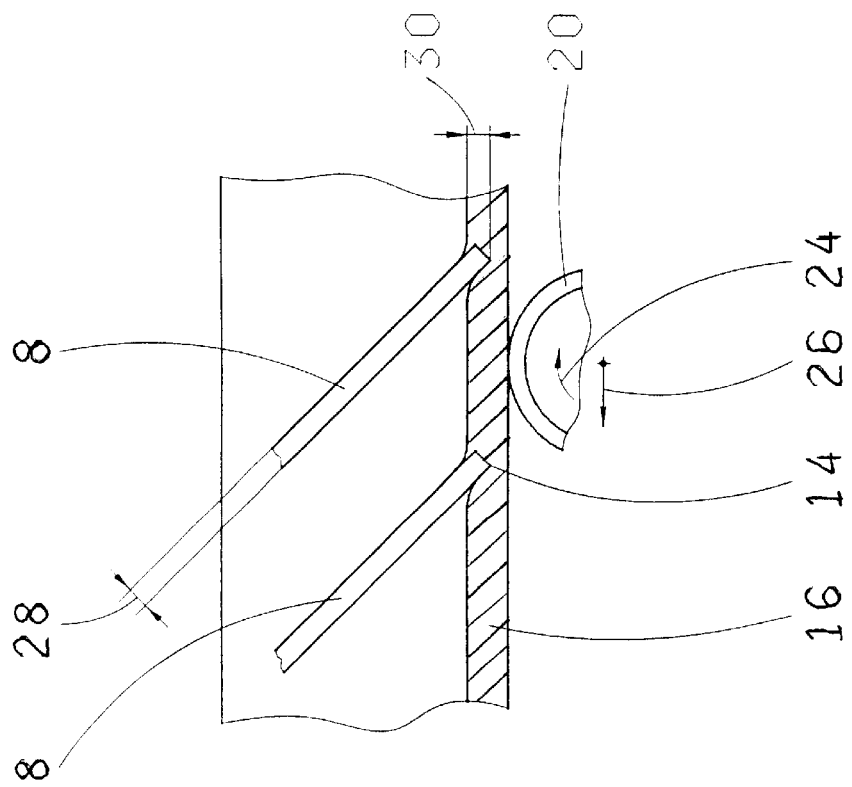
FIG. 1 is a cross-section through an apparatus.

In FIG. 1, an apparatus is shown for the invented process. In a presentation of the tool 2, which indicates no further details thereof, a device 4 has an outer contour 6 which contains recesses 14 for the acceptance of the blades. The blades 8 lie in these recesses. The outer contour of the device 4 corresponds essentially to the inside contour of the blade 8. The blade 8 is pressed into the surrounding base body 16, at one end 12, which protrudes from the device 4. The base body 16 is a prefabricated component, such as a torus for instance, which is affixed in the tool 2 between the device 4 and a holder 18. A rotating pressure roller 20 runs at an appropriate separating distance from the outer contour 6 of the device 4 and exerts a pressure on the base body 16 against the device 4 and the blades 8, which is noted by the arrow 22. By means of the rotation of the pressure roller 20, the said malleable alloy of the base body 16 is caused to flow into the said recess between the blades, thus surrounding the end 12 of the blade 8 located therein so that a shape-fit connection is made between the base body 16 and the blade 8. This shape-fit connection is also tight against the medium employed in the hydrodynamic machine, preferably oil or water. The pressure roller 20 presses the base body 16 against the blades 8 along the entire contour 6, so that both the blades 8 as well as the inside contour of the base body finally assume the shape of the outer contour 6 of the device 4. The blade 8 is then fastened to into the base body 16 along its entire length.

Figure 2:
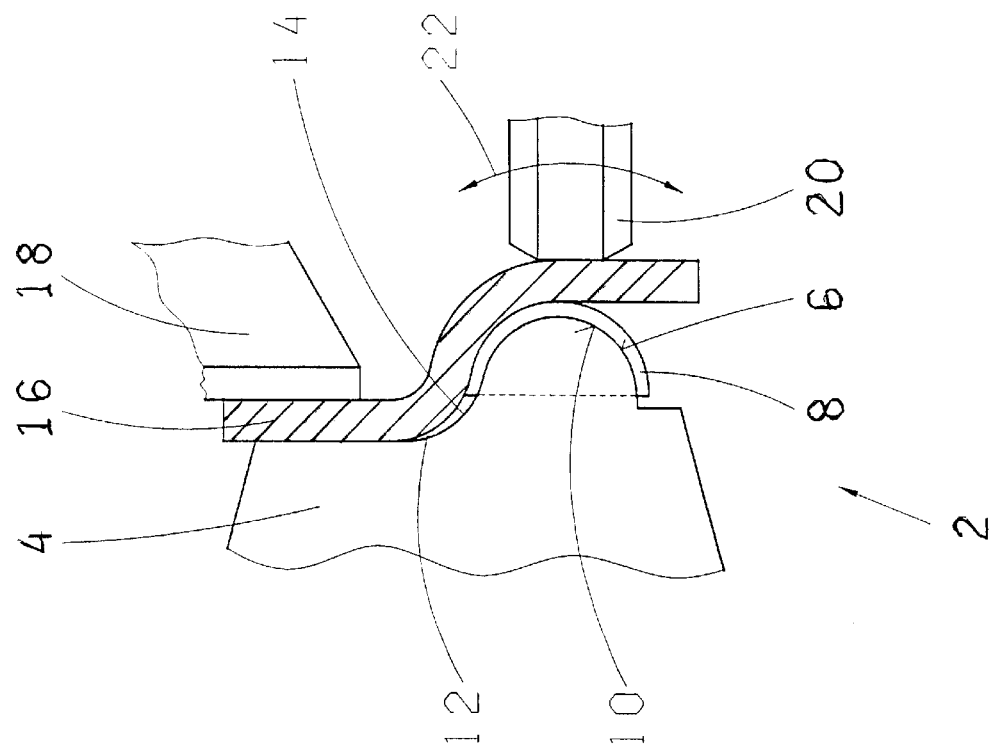
FIG. 2 is a cross-section through a base body.

In FIG. 2, blades 8 are shown which have been impressed into the base body 16. The pressure roller rotates, for example, in accord with the arrow 24, and is run along the base body 16 as shown by the arrow 26. Because of rotation while subjected to pressure during the passage, the material of the base body 16 is caused to move into the recess 14 in the base body 16. The blades possess a wall thickness 28 and the depth of the recess 14 is designated by the number 30.

By means of the process in accord with the invention, economical and liquid tight components for hydrodynamic machines can be manufactured, which assure close tolerances where sheet metal working is concerned and therewith make possible a precise characteristic curve for hydrodynamic machines. This is also favored by the possibility of a very good ability to maintain close tolerances over the run of a mass production cycle. In the case of a necessary tool exchange, a satisfactory degree of reproducibility of the specified dimensioning can be achieved. By means of the process, thin, pointed blades with a smooth surface can be used which promote high efficiency and a substantial production density. The cold-work hardening and the control of pressure characteristic stresses lead to the saving of weight, an advantage which is also supported by pressure rollers. Thus, a relatively simple and economical manufacturing process is made available which guarantees optimal functioning.

REFERENCE NUMBERS AND CORRESPONDING COMPONENTS 2 tool
4 device
6 outer contour
8 blade
10 inner contour
12 end of blade
14 recess
16 base body
18 holding apparatus
20 pressure roller
22 arrow
24 arrow
26 arrow
28 thickness of wall
29 depth

What is claimed is:

1. A process of manufacturing a component for a hydrodynamic machine in which the component comprises a base body (16) and a plurality of blades (8) which are to be installed on the base body (16);

the process comprising the step of:
installing the plurality of blades (8) on the base body (16) by a shaped fitted connection with the base body (16) by applying continuous pressure against the base body (16);
using a prefabricated torus as the base body (16); and
pressing the prefabricated torus by a pressure roller (20) against the plurality of blades (8) while holding the plurality of blades (8) in a device (4) against the pressure of the pressure roller (20).

2. The process according to claim 1, further comprising the step of applying the pressure by the pressure roller (20) upon the base body (16) on a side of the base body (16) which is located opposite from the plurality of blades (8).

3. The process according to claim 1, further comprising the step of conducting the pressure roller (20) along the base body (16) at a right angle to an outer contour of the device (4) in which the plurality of blades (8) are placed.

4. The process according to claim 1, further comprising the step of moving the pressure roller (20) along the base body (16) in a direction opposite to a direction of rotation of the pressure roller (20) in order to force material of the base body (16) between the blades to form a shape-fit connection.

5. The process according to claim 1, further comprising the step of pressing the plurality of blades (8) residing in the device (4) against an outer contour (6) which essentially corresponds to an inner contour (10) of the plurality of blades (8) in order to retain a shape of the plurality of blades following subjecting the plurality of blades (8) to the pressure of the pressure roller (20).

6. The process according to claim 1, further comprising the step of prefabricating the base body (16) and the base body (16), when subjected to the pressure of the pressure roller (20) during the formation of the shape-fitting connection with the plurality of blades (8), assumes a final shape which corresponds to an outer contour (6) of the device (4).

7. A component for a hydrodynamic machine with a base body (16) having a plurality of blades (8) connected to the base body, the plurality of blades (8) are shape-fit into recesses (14) in the base body (16) by a continuously rotating pressure roller (20) exercising continuous pressure in a direction against the plurality of blades (8);
wherein the base body (16) is a prefabricated torus which is pressed by the pressure roller (20) against the plurality of blades (8) and the plurality of blades (8) are held by a device (4) subjected to the pressure of the pressure roller (20).

8. The component according to claim 7, wherein a wall thickness (28) of at least one of the blades and the base body (16) has a different dimension along one of a longitudinal length thereof and a width thereof.

9. The component according to claim 7, wherein the base body (16) and the plurality of blades (8) comprising different materials.

10. The component according to claim 7, wherein the base body (16) is made of a malleable aluminum alloy.

11. The component according to claim 7, wherein the hydrodynamic machine is a torque converter for a transmission of a vehicle.

12. The component according to claim 7, wherein the hydrodynamic machine is a hydrodynamic retarder.

* * * * *